United States Patent [19]

Schloerb et al.

[11] Patent Number: 4,475,026
[45] Date of Patent: Oct. 2, 1984

[54] UNDERWATER ARC STUD WELDING SYSTEM

[75] Inventors: David Schloerb, Chicago, Ill.; Koichi Masubuchi, Arlington, Mass.

[73] Assignee: Massachusetts Institute of Technology, Cambridge, Mass.

[21] Appl. No.: 401,784

[22] Filed: Jul. 26, 1982

[51] Int. Cl.³ .............................................. B23K 9/20
[52] U.S. Cl. ......................................... 219/98; 219/72
[58] Field of Search ............................... 219/99, 98, 72

[56] References Cited

U.S. PATENT DOCUMENTS

| 2,307,026 | 1/1943 | Crecca | 219/98 |
| 2,315,502 | 4/1943 | Crecca et al. | 219/98 |
| 3,989,920 | 11/1976 | Masubuchi et al. | 219/98 |

FOREIGN PATENT DOCUMENTS 2042391 9/1980 United Kingdom .................. 219/98

OTHER PUBLICATIONS

Cary, Howard B., *Modern Welding Technology*, Prentice Hall, 1979, pp. 694-696.

Primary Examiner—Roy N. Envall, Jr.
Assistant Examiner—C. M. Sigda
Attorney, Agent, or Firm—Arthur A. Smith, Jr.; Thomas J. Engellenner

[57] ABSTRACT

An underwater arc stud welding system consists of a specially designed submersible stud welding gun which is connected, by means of an electrical umbilical to conventional stud welding equipment located out of the water. The stud gun employs a simple, corrosion resistant, stud lifting mechanism with only one moving part, which freely floods with water and thereby eliminates problems associated with increased ambient pressure and also employs a magnetic base and a grounded electrical safety shield.

11 Claims, 2 Drawing Figures

UNDERWATER ARC STUD WELDING SYSTEM

The government has rights in this invention pursuant to Sea Grant No. NA81-AA-D-00069 awarded by the National Oceanic and Atmospheric Administration in the U.S. Department of Commerce.

TECHNICAL FIELD

This invention relates to welding apparatus and, in particular, to underwater wet welding apparatus.

BACKGROUND OF THE INVENTION

Attention is directed to a masters thesis by one of the inventors herein entitled "Development of a Diver Operated Underwater Arc Stud Welding System" (M.I.T. 1982) herein incorporated by reference.

Prior art underwater welding techniques can be characterized as either dry or wet. In dry underwater welding a water-free habitat is constructed about the surface to be welded and then conventional methods are followed. See, for examples, U.S. Pat. No. 3,989,920 issued to Masubuchi et al on Nov. 2, 1976 and U.S. Pat No. 4,069,408 issued to Masubuchi et al on Jan. 17, 1978. In wet welding, the arc is struck through the water in order to melt the metal surface to be welded. Wet weld joints tend to be erractic and the operation is slow and laborious.

There exists a need for better wet welding techniques, particularly for welding of metal studs to metal walls. An apparatus for welding studs to walls efficiently would find use in repairs of vessels and other structure at sea, seawall reconstruction and other applications.

SUMMARY OF THE INVENTION

This invention provides an automatic means of attaching metal studs to a metal structure underwater at a faster rate and/or with a superior quality of attachment than can be achieved by conventional techniques. Like conventional arc stud welding on land, the system welds a stud to a surface by lifting the stud off the work surface by a pre-determined distance and initiating an electic arc between the stud and the work surface. Force to lift the stud is generated by a solenoid. Heat from the electric arc melts the end of the stud and a portion of the work surface. After a pre-determined time the arc is stopped and the stud is pressed against the work surface. Force to press the stud against the work surface is provided by a spring which is compressed prior to the beginning of the weld cycle. A disposable ceramic collar, called a ferrule, is held in place around the base of the stud in order to prevent weld splatter. The molten metal solidifies quickly, once the stud is pressed against the work surface, leaving the stud welded in place.

Our invention will next be described in connection with a preferred embodiment. However, it should be clear that various changes, modifications and substitutions can be made by those skilled in the art without departing from the spirit and scope of our claims.

DETAILED DESCRIPTION OF THE PREFERRED EMBODIMENT

Figure 1:
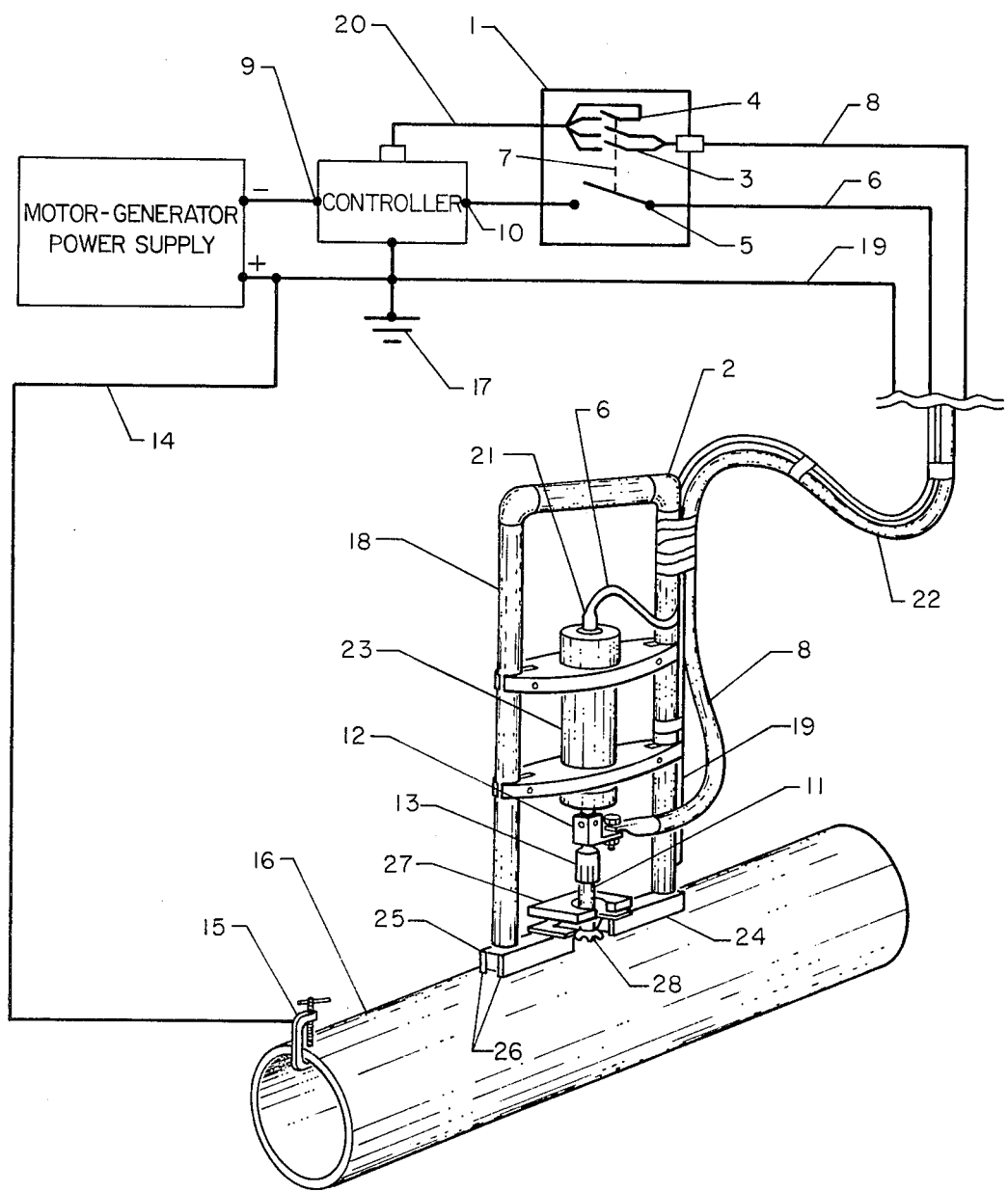
FIG. 1 is a partially schematic view of our welding system.

FIG. 1 illustrates the major components of the invention. The system consists of the power supply, the controller, the knife switch 1, the interconnecting electrical leads, and the underwater stud gun 2. The stud gun is operated by a diver.

The power supply and controller are located out of the water on a work platform. A conventional D.C. stud welding power supply and a conventional stud welding controller are used. It is preferred to use a motor-generator power supply rather than the transformer-rectifier type for reasons of electrical safety.

The knife switch 1, equipped with three auxiliary blade type switches 3 4 in addition to the main contacts 5, is used to insure that electrical power to the stud gun is off when it is not needed. The preferred switch design consists of two main contacts 5, which are connected in parallel and serve to disconnect the hot welding lead 6 to the stud gun. The auxillary switch blades 3 4 are mounted in between the two main contacts on the insulated cross bar 7 which mechanically connects the main contacts. The arrangement is such that all of the switches are closed, or opened, with one action of the cross bar.

Two of the auxiliary switches 3 of the knife switch serve to disconnect the control lead 8 to the underwater stud gun. The third auxiliary switch 4 serves as the trigger switch which initiates the welding process.

The hot side of the welding circuit begins at the negative terminal of the power supply and runs to the input connection 9 on the controller. It continues from the output connection 10 of the controller to the knife switch 1 and then to the stud gun 2 where it makes electrical contact with the stud 11 by means of the chuck holder 12 and the chuck 13. The ground lead 14 runs from the positive terminal of the power supply to a clamp 15 attached to the work surface 16.

The positive terminal of the power supply is also grounded to some point on the work platform 17. The controller is also grounded to this point as is the frame of the underwater stud gun. The stud gun frame 18 is grounded by means of a cable 19 in order to reduce the electric field surrounding the stud gun 2 to a safe level.

The control circuit begins at the controller and runs to the knife switch 1. This portion of the control circuit 20 employs a 4 conductor cable. Two the the conductors serve as the trigger circuit and the other two are part of the solenoid circuit. The control circuit continues from the knife switch 1 to the underwater connector 21. This portion of the control circuit 8 employs a 2 conductor cable and constitutes the remainder of the solenoid circuit.

All of the electrical leads which run to the underwater stud gun 6 8 19 are taped together like a conventional diving umbilical. These leads make up the stud gun's underwater umbilical 22.

The underwater stud gun consists of the stud lifting mechanism 23, the aluminum frame 18, and the magnetic base 24. The magnetic base consists of two ceramic magnets 25, one on either side of the center line of the stud gun, each of which is sandwiched between two ferrous pole plates 26. The magnet assemblies can attach to both flat and cylindrical surfaces. The stud gun also employs the ferrule clamp assembly 27 to hold a conventional disposable ceramic ferrule 28 around the base of the stud 11.

Figure 2:
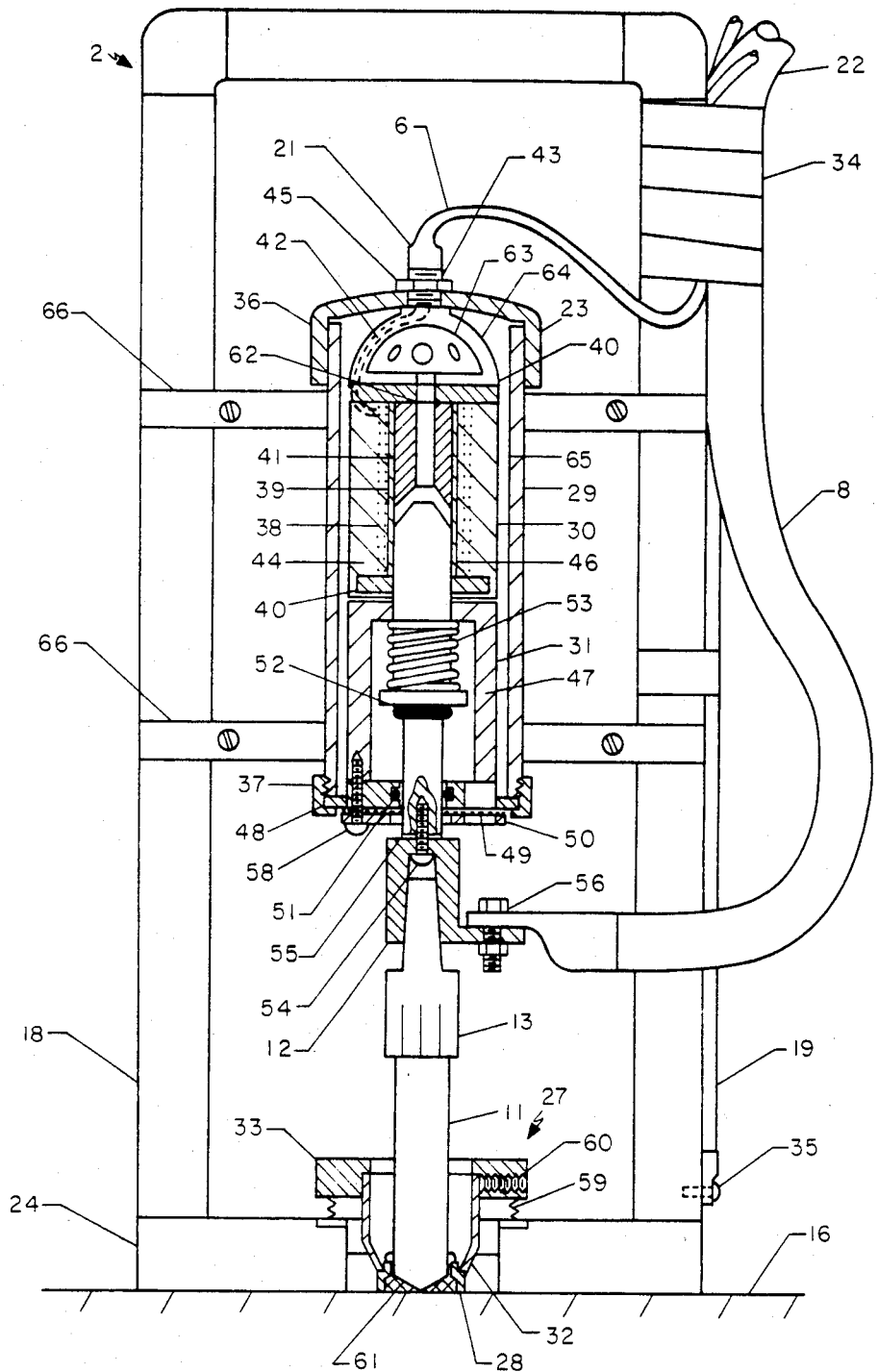
FIG. 2 is a cross-sectional detailed view of the stud gun of our invention.

FIG. 2 presents a detailed drawing of the underwater stud gun 2 which shows a cross sectional view of the stud lifting mechanism 23, the ferrule 28, and the ferrule clamp assembly 27. The stud lifting mechanism is composed of three sub-assemblies; the outer case 29, and solenoid 30, and the lifting rod assembly 31. The ferrule clamp assembly consists of the ferrule clamp 32 and the ferrule clamp mount 33. These assemblies are held together by means of the aluminum frame 18. The electrical umbilical 22 is secured to the frame by means of electrical tape 34. The frame ground lead is electrically connected to the frame by means of a screw 35. The frame is designed to the inexpensive and easy to replace so that it can be modified to suit individual jobs. The frame also serves as cathodic protection for the magnetic base.

The outer case 47 of the stud lifting mechanism may be made from a piece of PVC pipe which is threaded on one end and has a PVC pipe cap 36 glued onto the opposite end. The threaded brass retainer 37 screws onto the end of the case and rigidly clamps the lifting rod assembly 31 in place. The outer case serves to support and protect the solenoid 30 and the lifting rod assembly 31. It also insulates these components from the surrounding water and thereby prevents electrolysis of the components.

The solenoid 30 consists of the following parts. The wire coil 38 is wrapped around the non-ferrous support tube 39 which is attached to the end pole plates 40 and the fixed solenoid core 41. Wire leads 42 connect the coil 38 to the terminals of the underwater connector 43. All of these components are held together and partially encapsulated in a rubber case 44.

The underwater connector 43 penetrates the end of the outer case. The mating connector 21 on the end of the control lead 8 plugs into this connector and thereby makes electrical connection to the solenoid. The underwater connector is clamped to the outer case by a nut 45 in such a way that electrical insulation of the outer case is preserved.

The top portion of the rubber solenoid case 44, between the underwater connector 43 and the other solenoid components, serves as a spring and damper. The spring action of the rubber case holds the solenoid 30 against the lifting rod assembly 31. The damping action serves to absorb the impulse of the lifting rod 46 striking the fixed core 41. The design of the rubber case 44 is such that the solenoid is relatively free to move laterally so that it can seek the best possible alignment with the lifting rod.

The lifting rod assembly 31 consists of the following parts: the lifting rod 46, the chuck holder 12, the cylinder 47, the front plate 48, the dirt screen 49, the dirt screen retainer 50, the dirt seal 51, the shock absorber 52, and the main spring 53.

The lifting rod 46 preferrably is made of a corrosion resistant ferrous material. The lifting rod 46 serves as the moving solenoid core and transmits force to the stud 11 by means of the chuck holder 12 and a standard stud welding chuck 13. The chuck holder is attached to the lifting rod by a screw 54. A lockwasher 55 prevents the chuck holder from working loose. The chuck holder also provides the electrical attachment point 56 for hot welding lead. The lifting rod is supported by the cylinder 47, which is made of non-conduction bearing material, and the dirt seal 51. The dirt seal serves as both a bearing for the lifting rod 46 and a shaft seal to prevent dirt from entering the lifting mechanism. The dirt screen 49 prevents dirt from entering the lift mechanism through the flood ports 57. The dirt screen 49 is held in place by the dirt screen retainer 50. Screws 58, which are equally spaced around the axis of the lifting rod assembly, hold the assembly together. The main spring 53 provides the force to press the stud 11 against the work surface 16 at the end of the weld cycle. The shock absorber 52 reduces the impulse of the lifting rod striking the front plate 48 and prevents electrical contact between the lifting rod 46 and the front plate 48 thereby preventing electrochemical corrosion.

The ferrule clamp mount is supported on springs 59 so that the ferrule clamp 32 will be firmly seated on the ferrule 28 even if the stud gun is tipped slightly. A standard ferrule clamp 32 is held in the ferrule clamp mount 33 by means of a set screw 60.

In order to avoid the need for handling the ferrules underwater, the studs may be prepared out of the water by wrapping steel wool 61 over the end of the studs and then press-fitting the ferrule 32 over the steel wool 61. The steel wool 61 also serves to help initiate the welding acr.

To make a weld the diver loads a stud 11 into the chuck 13. When the stud is first loaded into the chuck, before the main spring is compressed, the end of the stud extends beyond the base of the stud gun. Once the stud is loaded, the diver presses the stud gun 2 against the work surface, thereby compressing the main spring 53, until the magnetic base 24 attaches to the work surface 16. Next, the diver orders the tender to activate the system. The tender closes the knife switch 1 which completes all electrical circuits to the underwater stud gun and causes the controller to begin the weld cycle by energizing the solenoid 30 and initiate an arc between the stud 11 and the work surface 16.

When the solenoid is energized, the magnetic field produced by the wire coil 38 pulls the lifting rod 46 against the fixed solenoid core 41. Water displaced by the motion of the lifting rod 46 flows through a hole 62 in the fixed solenoid core 41 into a plenum 63 and out holes 64 in the rubber solenoid case 44. The displaced water is then free to flow through the annular space 65 between the solenoid 30 and the outer case 29. This space communicates with the inside of the lifting rod assembly cylinder 47 and the outside of the outer case by means of the flood ports 57.

The action of the lifting rod causes the end of the stud to be lifted from the work surface by a distance which is just equal to the gap between the lifting rod and the fixed solenoid core. This distance, which is called the arc length, is adjusted by moving the stud lifting mechanism support clamps 66 on the frame 18.

At the end of the weld cycle the controller shuts off electrical power to the solenoid and stops the weld current. As soon as the solenoid 30 is de-energized, the main spring 53 forces the stud 11 back against the work surface 16 and the weld is made.

When the controller indicates that the weld cycle is over, or on command from the diver, the tender opens the knife switch 1. Then, the diver releases the magnetic base 24 by yanking on the aluminum frame 18. The chuck 13 pulls free of the stud 11, which is now welded to the work surface 16, in the same motion.

We claim:

1. An underwater welding gun for welding a metal stud to a metal surface, the gun comprising:
   (a) a support frame;

(b) arc-generating means attached to the frame for generating an arc between the stud and the metal surface underwater;

(c) water floodable lifting means attached to the frame for lifting the stud a pre-determined distance away from the surface;

(d) forcing means attached to the frame for forcing the stud against the surface; and (e) above-water switching means for activating the arc-generating means, whereby a stud may be loaded onto the lifting means, lifted from the surface while an arc is discharged between it and the surface, and then forced against the surface in a molten state to weld the stud and surface together.

2. The gun of claim 1 wherein the lifting means is a solenoid having a movable core.

3. The gun of claim 2 wherein the lifting means further comprises a releasable chuck attached to the core for holding the stud.

4. The gun of claim 1 wherein the forcing means is a spring.

5. The gun of claim 1 wherein the lifting means is water-floodable thereby providing compensation for increased ambient pressure.

6. The gun of claim 1 wherein the support frame is electrically grounded and serves as an electrical safety shield.

7. The gun of claim 1 wherein the support frame also comprises a carrying handle.

8. The gun of claim 1 wherein the support frame further comprises a magnetic base for attaching the frame to the metal surface.

9. The gun of claim 1 wherein the support frame is aluminum.

10. The gun of claim 1 wherein the gun further comprises a ferrule clamp attached to the frame and expendable ferrules attached to the studs, the ferrules serving to prevent weld spatter.

11. An underwater welding gun for welding a stud to a metal surface, the gun comprising:

(a) an electrically grounded support frame having a carrying handle and a magnetic base for attaching the frame to the surface, the frame also serving as an electric safety shield;

(b) arc generating means attached to the frame for generating an arc between the stud and the metal surface underwater;

(c) lifting means attached to the frame for lifting the stud a pre-determined distance away from the surface, the lifting means being water floodable to compensate for pressure and comprising a solenoid having a movable core and a releasable chuck attached to the core for holding the stud;

(d) spring forcing means attached to the frame for forcing the stud against the surface;

(e) a ferrule clamp attached to the frame and expendable ferrules attached to the studs to prevent spatter; and (f) above-water switching means for activating the arc-generating means, whereby a stud may be fitted with a ferrule and loaded into the chuck of the lifting means, lifted from the surface while an arc is discharged between it and the surface, and then forced against the surface in a molten state to weld the stud and surface together.

* * * * *